(12) United States Patent
Lieber

(10) Patent No.: US 8,708,506 B1
(45) Date of Patent: Apr. 29, 2014

(54) FROZEN SURFACE TECHNOLOGY

(75) Inventor: Michael D. Lieber, Boulder, CO (US)

(73) Assignee: Ball Aerospace & Technologies Corp., Boulder, CO (US)

( * ) Notice: Subject to any disclaimer, the term of this patent is extended or adjusted under 35 U.S.C. 154(b) by 365 days.

(21) Appl. No.: 13/052,894

(22) Filed: Mar. 21, 2011

Related U.S. Application Data

(60) Provisional application No. 61/317,957, filed on Mar. 26, 2010.

(51) Int. Cl.
*G02B 7/188* (2006.01)

(52) U.S. Cl.
USPC .................. 359/846; 359/849; 359/872

(58) Field of Classification Search
USPC .......... 359/843, 846, 849, 871, 872, 883
See application file for complete search history.

(56) References Cited

U.S. PATENT DOCUMENTS

| | | | |
|---|---|---|---|
| 7,102,114 B2 * | 9/2006 | Graves et al. | 250/201.9 |
| 7,301,690 B2 * | 11/2007 | Schenk et al. | 359/290 |
| 7,518,780 B2 * | 4/2009 | Papavasiliou et al. | 359/290 |
| 2002/0135908 A1 * | 9/2002 | Ryutov et al. | 359/846 |
| 2003/0223135 A1 * | 12/2003 | Carreras et al. | 359/846 |
| 2004/0021963 A1 * | 2/2004 | Carr et al. | 359/846 |
| 2009/0040462 A1 * | 2/2009 | Masunishi et al. | 351/221 |
| 2009/0051874 A1 * | 2/2009 | Masunishi et al. | 351/221 |
| 2009/0078850 A1 * | 3/2009 | Pinto | 250/201.9 |
| 2010/0078543 A1 * | 4/2010 | Winker et al. | 250/201.9 |
| 2011/0170180 A1 * | 7/2011 | Turner et al. | 359/385 |

OTHER PUBLICATIONS

Lang et al., Electrostatically Figured Reflecting Membrane Antennas for Satellites, IEEE Transactions on Automatic Control, vol. AC-27, No. 3, Jun. 1982, 5 pages.

Cadogan et al., "Rigidizable Materials for use in Gossamer Space Inflatable Structures", AIAA 2001-1417, 42nd AIAA/ASME/ASCE/AHS/ASC Structures, Structural Dynamics, and Materials Conference & Exhibit, AIAA Gossamer Spacecraft Forum, Apr. 2001, Seattle, Washington, 18 pages.

Maji et al., "Rigidization of a Deployable Membrane Reflector", AIAA 2002-1458, 43rd AIAA/ASME/ASCE/AHS/ASC Structures, Structural Dynamics, and Materials Con, Apr. 2002, Denver, Colorado, 6 pages.

(Continued)

Primary Examiner — Frank Font
(74) Attorney, Agent, or Firm — Sheridan Ross P.C.

(57) ABSTRACT

A frozen surface technology is provided that can be used to provide a precisely defined surface. The frozen surface technology can include the use of a frozen membrane. For instance, frozen membrane mirrors and methods of producing frozen membrane mirrors are provided. The frozen membrane mirror includes a membrane material having a reflective surface. Active control is used to maintain a desired figure of the reflective surface while a solidifying material is applied to a back side of the membrane material. Active control of the figure of the reflective surface is maintained while the solidifying material cures. Once the solidifying material has been applied and cured, active control can be removed. The frozen surface technology also enables the formation of a surface with a precisely defined shape from a shell material that is brought into a flexible state, is actively controlled to achieve the desired surface shape, and that continues to be actively controlled until the shell material has been brought into a fixed or frozen state.

12 Claims, 11 Drawing Sheets

(56) References Cited

OTHER PUBLICATIONS

Gunderson et al., "Pressure-Augmented Near Net-Shape Membrane Mirror", AIAA 2004-1501, 45th AIAA/ASME/ASCE/AHS/ASC Structures, Structural Dynamics & Materials Conference, Apr. 2004, Palm Springs, California, American Institute of Aeronautics and Astronautics, Inc., 6 pages.

Ash et al., "Shape Achievement of Optical Membrane Mirrors Using Coating/Substrate Intrinsic Stresses", Journal of Spacecraft and Rockets, vol. 41, No. 4, Jul.-Aug. 2004, American Institute of Aeronautics and Astronautics, Inc., 7 pages.

Patrick et al., "Final Testing and Evaluation of a Meter-Class Actively Controlled Membrane Mirror", AIAA 2006-1901, 47th AIAA/ASME/ASCE/AHS/ASC Structures, Structural Dynamics, and Materials Conference, May 2006, Newport, Rhode Island, 13 pages.

Cornelissen et al., "Development of a 4096 Element MEMS Continuous Membrane Deformable Mirror for High Contrast Astronomical Imaging", Advanced Wavefront Control: Methods, Devices and Applications IV, Proc. of SPIE vol. 6306, 630606-1, 2006, 11 pages.

Flint et al., "Coupled Structural Dynamics of Membrane Aperture Shells and Their Periphery Support Structures", AIAA 2007-1843, 48th AIAA/ASME/ASCE/AHS/ASC Structures, Structural Dynamics, and Materials Conference, Apr. 2007, Honolulu, Hawaii, Mevicon Inc., American Institute of Aeronautics and Astronautics, Inc., 15 pages.

Korde et al., "Studies on Small Circular Membrane Mirrors with Electrostatic Actuation and Closed Loop Control", Active and Passive Smart Structures and Integrated Systems 2007, Proc. of SPIE vol. 6525 652620-1, 2007, 11 pages.

Black et al., "Global Static Testing and Model Validation of Stiffened Thin-Film Polymide Panels", Journal of Spacecraft and Rockets, vol. 45, No. 6, Nov.-Dec. 2008, 6 pages.

\* cited by examiner

FROZEN SURFACE TECHNOLOGY

CROSS-REFERENCE TO RELATED APPLICATIONS

This application claims the benefit of U.S. Provisional Patent Application Ser. No. 61/317,957, filed Mar. 26, 2010, the entire disclosure of which is hereby incorporated herein by reference.

FIELD

The disclosed invention is directed to a frozen surface technology. More particularly, the present invention is directed to the formation of a mirror or other shaped surface, that is initially provided as a flexible surface or a shell that is induced to be flexible, with a shape that is fixed while active control of the surface is maintained.

BACKGROUND

Various devices or apparatuses can benefit from precisely formed surfaces. For example, precision optical devices often incorporate reflective surfaces or mirrors, which are typically required to have a precise shape or figure. Conventional processes for producing mirrors include laborious and time consuming precision grinding and polishing of the mirror surface. The cost of producing mirrors using conventional grinding and polishing techniques increases with the size of the mirror. In addition to being relatively expensive, grinding and polishing to produce a mirror is time consuming, and does not lend itself to mass production of precision mirrors. For mass production of mirrors, replicated optics techniques can be used. However, the precision of mirrors produced using replicated optics is limited, and the shape produced is fixed.

More recently, mirrors have been produced that operate under active control. For example, electrostatically controlled membrane mirrors (ECMM) have been developed. An ECMM design utilizes flexible polymer films with reflective coating to create a commanded mirror-figure. Active control of the figure of the mirror is used as a substitute for a fixed mirror surface in providing precision optical characteristics. ECMM type devices can facilitate the deployment of relatively large, relatively lightweight mirrors. However, the requirement that the mirror surface be under constant active control while in use adds to the complexity and to the power requirements of the ECMM systems.

SUMMARY

Embodiments of the present invention are directed to solving these and other problems and disadvantages of the prior art. Embodiments of the present invention provide a frozen surface technology for producing or forming a surface with a precise shape or figure. The frozen surface technology can include a frozen mirror element or some other precisely formed surface. According to embodiments of the present invention, the surface can be formed from a membrane that is actively controlled to have a selected shape on a first surface, and that is fixed or rigidized by the addition of a solidifying fluid to a second side of the membrane. In accordance with other embodiments of the present invention, the surface can be formed from a shell structure while that material is at an elevated temperature thus being in a flexible state, active control is used to freeze the surface shape. Moreover, the shell structure can be further rigidized by adding a solidifying material and/or while the shell structure surface is actively controlled. Embodiments of the present invention invert the traditional mold shape, grind, polish and coat process for manufacturing optics in that the mirror and coating is formed first and shaped last.

For example, embodiments of the present invention provide a frozen membrane mirror or frozen membrane mirror technology (FMMT) that utilizes active control of the reflective surface of a mirror element comprising a membrane material to command a desired figure or profile on the reflective surface while the membrane is undergoing a rigidization process. More particularly, active control of the mirror's reflective surface is maintained while a solidifying material is applied to a back surface of the membrane, and while that solidifying material cures. Once the solidifying material has cured it forms a rigid layer, and the figure of the reflective surface is fixed or frozen. Only after the figure of the reflective surface is fixed is the active control of that surface removed. Accordingly, a precision mirror can be formed without requiring grinding and polishing, as compared to a mirror formed using other techniques. In addition, a rigidized membrane mirror can be provided that does not require any active control of the mirror figure while the mirror is in use.

In accordance with further embodiments of the present invention, frozen shell mirror technology (FSMT) comprising a frozen shell with a reflective surface is provided. In such embodiments, the figure of the reflective surface of the shell is actively controlled while the shell is in a malleable state. Active control is continued as the shell is brought from a malleable state to a fixed or frozen state. As an example, a shell may comprise a polyimide composite matrix or other material that is heated to place the shell in a malleable state, and that is allowed to cool to place the shell in a fixed state.

In accordance with embodiments of the present invention, a reflective membrane or membrane mirror is held in tension by a mounting ring or frame. Adjacent a back side of the membrane mirror material is a rigid back plate or control surface. The back plate may include or be associated with an electrostatic control mechanism. The electrostatic control mechanism is operated to control the precise shape or figure of the reflective surface of the membrane mirror. The electrostatic actuators can be operated in response to information regarding the figure of the mirror obtained from wavefront sensors and/or proximity sensors. With the actuators maintaining the first or reflective surface of the membrane in the desired shape, a solidifying material is introduced to a second or back surface of the membrane. In accordance with embodiments of the present invention, the membrane can be provided as part of an envelope structure, with one boundary surface of the envelope structure being provided by the second surface of the membrane, and the surface of the envelope structure opposite the second surface of the membrane being provided by an envelope layer or surface. In accordance with other embodiments of the present invention, the solidifying material may be introduced into a void between the back surface of the membrane mirror and the back plate. In accordance with still other embodiments of the present invention, the solidifying material may be applied to a back surface of the membrane mirror. Active control of the figure of the membrane mirror is maintained until the solidifying material has cured to form a rigid layer. Accordingly, the surface of the membrane mirror can be brought into a desired shape while under active control, and can be held in that shape while a fixing material cures, resulting in a completed mirror structure, without requiring grinding or polishing. Moreover, a rigidized membrane mirror can be generated, with a desired figure, that does not require any further active control while in use.

In accordance with further embodiments of the present invention, a frozen membrane mirror is provided. The frozen membrane mirror includes a nominally flexible membrane material with a first, reflective side and a second, back side. A cured or solidifying material is bonded or fixed to the back side of the flexible membrane. The cured material is rigid enough to hold the shape of the reflective surface of the flexible membrane in a desired position, to provide a desired mirror figure.

In accordance with other embodiments of the present invention, a frozen mirror element comprising a shell with a reflective surface is provided. The shell can be brought into a malleable state, such that a reflective surface on one side of the shell can be placed in a desired shape, to provide a desired mirror figure. The shell can also be brought into a fixed state. In accordance with embodiments of the present invention, after the reflective surface of the shell has been controlled to achieve the desired figure using active control, the shell is brought into a fixed state. Active control of the figure of the reflective surface is maintained while the shell is brought into the fixed state. In accordance with additional embodiments of the present invention, a frozen mirror element comprising a shell with a reflective surface can include a rigid layer that is applied as a solidifying material to the back surface of the shell. In such embodiments, while active control is used to maintain the figure of the reflective surface of the mirror while the shell is brought to a fixed state, active control is optional while adding a solidifying material to the back surface of the shell to form a rigid layer applied to the shell. For instance, if the shell is sufficiently rigid after it is brought to a fixed state to maintain the desired figure of the effective surface, active control can be discontinued while a solidifying material is applied. Alternatively, active control can be continued while solidifying material is applied to the back surface of the shell. Accordingly, although a shell material is characterized by an ability to maintain its shape, at least under some conditions, a rigid layer can be added to increase the resistance of the mirror element to deformation.

In accordance with still other embodiments of the present invention, a system for producing a precisely shaped frozen surface using a membrane material is disclosed. For example, a frozen membrane mirror can be provided. The system includes a membrane with a mirrored or reflective surface that is held within a ring or mount. The system additionally includes a back plate or control surface adjacent a back surface of the membrane. The system further includes a plurality of actuators disposed across the control surface. The plurality of actuators are interconnected to a charge source. The amount of charge provided by the charge source to individual actuators is controlled by a controller. Moreover, the controller receives information from one or more sensors regarding the figure of the membrane's reflective surface, which is used to determine the charge applied to the plurality of actuators. By selectively varying the amount of charge provided to individual actuators, the force of attraction between individual actuators and corresponding areas of the membrane can be controlled, to thereby control the figure of the reflective surface. An injector for introducing a rigidizing or solidifying material to the back surface of the membrane is also provided. In accordance with embodiments of the present invention, the figure of the reflective surface of the membrane is maintained in position while the solidifying fluid is introduced to the back surface of the membrane through the injectors. This active control of the figure of the reflective surface is maintained as one or more coats of solidifying fluid are applied, and as the solidifying fluid sets or cures, to form a rigid layer.

A system in accordance with embodiments of the present invention can also be used to produce a precisely shaped frozen surface using a shell material. For example, the system can be used to produce a frozen mirror element comprising a shell with a reflective surface. The system includes a shell material with a reflective surface on a first side. The shell may be held within a ring or mount that places the shell in proximity to a back plate or control surface adjacent a back surface of the shell. The system can also include a means for placing the shell in a malleable state. The system further includes a plurality of actuators disposed across the control surface. The plurality of actuators are interconnected to a charge source, and the amount of charge provided by the charge source to individual actuators is controlled by a controller. Information is provided to the controller from one or more sensors regarding the figure of the shell's reflective surface, which is used to determine the charge applied to the plurality of actuators. By selectively varying the amount of charge provided to individual actuators, the force of attraction between individual actuators and corresponding areas of the shell can be controlled, to thereby control he figure of the reflective surface. Active control of the figure of the reflective surface is maintained while the shell is in a malleable state. Moreover, such active control is maintained while the shell is brought from a malleable state to a fixed state. As an example, the shell can be placed in a malleable state by heating the shell material to at least a first temperature, and fixing the shell can be performed by cooling the shell material to less than a second temperature. The system can also include adding a solidifying material to a back surface of the shell, to form a rigid layer after the solidifying material cures. Depending on the ability of the shell to maintain the desired figure while and until the solidifying material has been applied, active control of the reflective surface figure can be continued while the solidifying material is applied, and/or while the solidifying material cures to form a rigid layer.

Additional features and advantages of embodiments of the present invention will become more readily apparent from the following description, particularly when taken together with the accompanying drawings.

DETAILED DESCRIPTION

Figure 1:
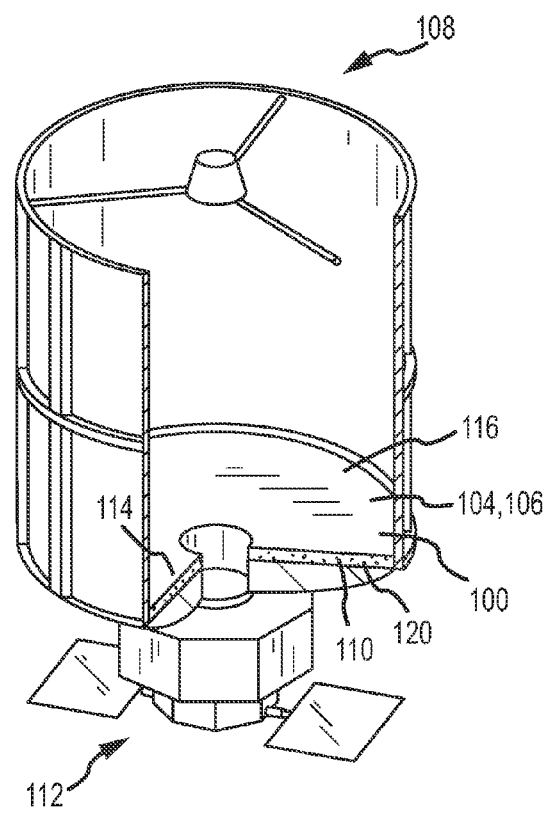
FIG. 1 illustrates a frozen mirror element in accordance with embodiments of the present invention, incorporated into a telescope assembly provided as part of a satellite.

FIG. 1 illustrates a frozen surface and in particular a frozen mirror element 100 in accordance with embodiments of the present invention. The frozen mirror element 100 can comprise a frozen membrane mirror 104 or a frozen shell mirror 106. In this example, the frozen mirror element 100 is included in a telescope 108 deployed as part of a spacecraft or satellite 112. In general, a frozen membrane mirror 104 includes a flexible membrane 114 with a mirrored or reflective surface 116 having a shape or figure that is fixed by a solidifying or rigidizing material 120 that has cured to form a rigid layer. Unlike a typical membrane mirror, the frozen membrane mirror 104 of embodiments of the present invention does not require active control in order to maintain its figure while deployed and in use. A frozen shell mirror 106 includes a shell 110 with a reflective surface 116 that has a flexible or malleable state, and a fixed or frozen state. When in the frozen state, the frozen shell mirror 106 does not require active control in order to maintain its figure while deployed and in use.

Figure 2A:
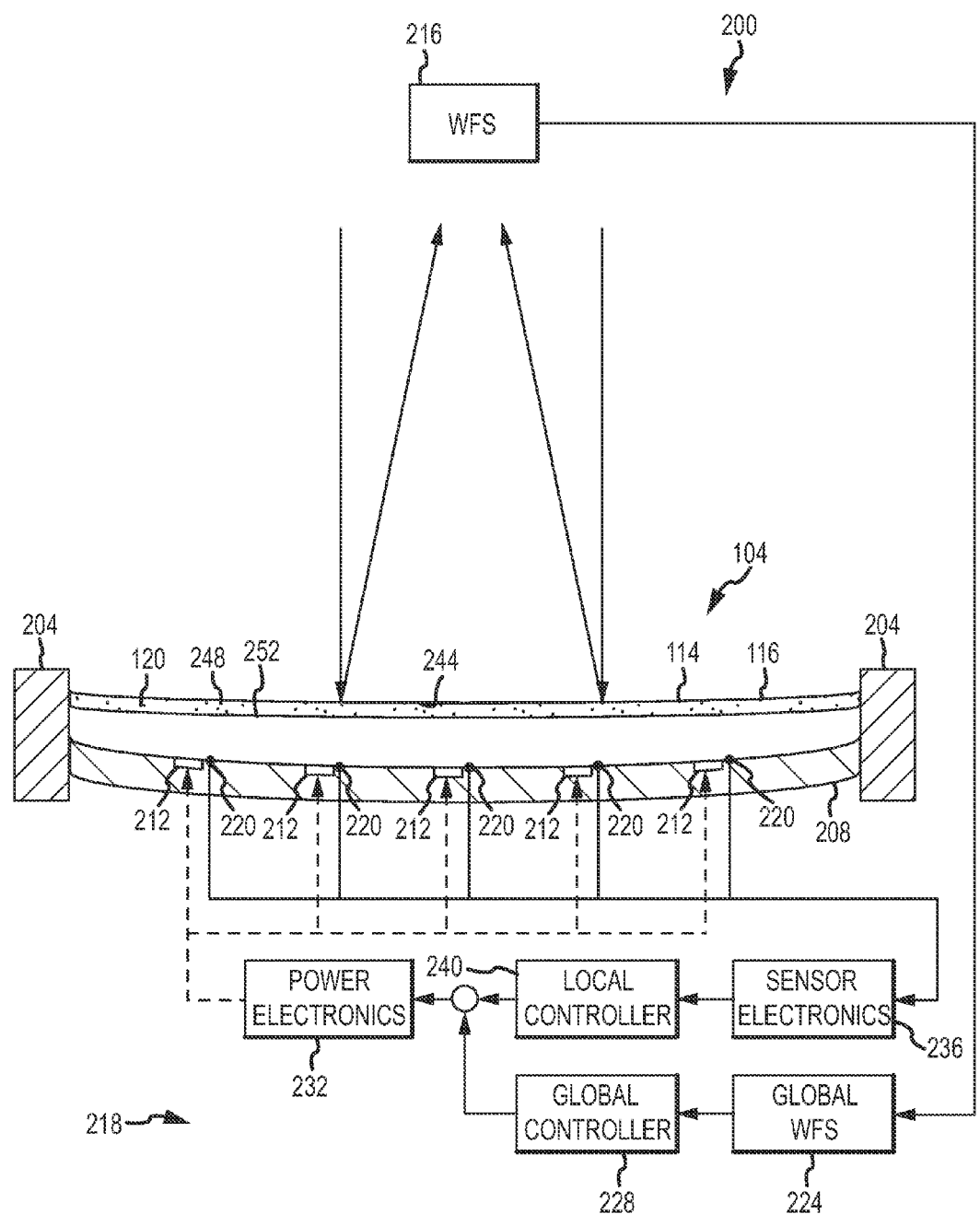
FIG. 2A is a cross-section of a frozen membrane mirror and back plate assembly in accordance with embodiments of the present invention.

FIG. 2A is a cross-section of a frozen surface system 200 incorporating a frozen membrane mirror 104 in accordance with embodiments of the present invention, while the figure of the reflective surface 116 is being fixed or formed. In general, the membrane 114 is placed within a ring or mount 204 under tension. The ring or mount 204 may include or be associated with a rigid back plate or control surface 208. As can be appreciated by one of skill in the art, while held under tension within the mount 204, the membrane 114 will generally be planar in form. As can also be appreciated by one of skill in the art, typical applications of precision mirrors such as may be provided by embodiments of the present invention require that the mirror figure be parabolic, spherical, or some other non-planar shape or figure. The process can also incorporate pre-formed membranes 114 which are close to the desired figure to minimize stress or tension.

The rigid control surface 208 can include or be associated with a plurality of actuators or actuation pads 212. By selectively applying a charge to selected actuation pads 212, the distance between the membrane 114 and the rigid control surface 208 can be controlled. For example, where a negative bias voltage is applied to the membrane 114, a selected area of the membrane 114 can be drawn towards the rigid control surface 208 by applying a positive control voltage to an actuation pad 212 adjacent the area of the membrane 114 that is to be drawn closer to the rigid control surface 208. In particular, the force on the membrane 114 is proportional to the voltage level and the permittivity of the gap, and inversely proportional to the square of the distance between the membrane 114 and the control surface 208. Accordingly, the figure of the reflective surface 116 can be controlled. In accordance with other embodiments, a positive bias voltage may be applied to the membrane 114 and a negative control voltage can be applied to selected actuation pads 212. As can be appreciated by one of skill in the art after consideration of the present disclosure, different control voltages can be applied to different actuation pads 112 at different locations across the control surface 208, such that the reflective surface 116 of the membrane 114 acquires the desired figure. In addition or as an alternative to electrostatic forces, other forces can be applied. For example, magnetic forces can be used to create a force between the membrane 114 and the control surface 208 and to actively control the figure of the reflective surface 116 of the membrane 114.

Information regarding the figure of the reflective surface 116 can be obtained using a wavefront sensor 216. For example, the wavefront sensor 216 may comprise a commercially available Shack-Hartmann wavefront sensor. Alternatively or in addition, information regarding the figure of the reflective surface 116 can be obtained from proximity sensors 220 that are associated with or adjacent to the actuation pads 212.

The frozen surface system 200 can include control system electronics 218. The control system electronics 218 can include various components, such as a global wavefront sensor processor 224, a global controller 228, power electronics 232, sensor electronics, and a local controller 240.

Information from a wavefront sensor 216 may be provided to the global wavefront sensor processor or control block 224. The global wavefront sensor processor 224 can provide a signal to the global controller processor function 228, the output of which is provided to the power electronics 232 that operate to control the operation of the actuation pads 212. As previously noted, proximity sensors 220 can also be included. As an example, a proximity sensor 220 can comprise a fiber optic sensor that measures the distance between the membrane 114 and the rigid control surface 208. Signals from proximity sensors 220 can be provided to the sensor electronics 236. The output from the sensor electronics 236 can be provided to the local controller 240. The output from the local controller 240 can be provided to the power electronics 232, again to control operation of the actuation pads 212. Moreover, where both a wavefront sensor 216 and proximity sensors 220 are provided, signals from those sensors that are output from the global controller 228 and the local controller 240 can be combined to provide the control signal that is used to control the output of the power electronics 232 and thus the force applied by the actuating pads 212 to the membrane 114. Accordingly, control of the mirror figure may be by a closed loop system. Other examples of sensors that can be used to provide information regarding the actual shape or figure of the surface include laser based devices and interferometers.

As described in greater detail elsewhere herein, sensing of the figure of the reflective surface 116 and active control of the figure of the reflective surface 116 is maintained while the rigidizing material 120 is introduced along at least a back surface 244 of the membrane 114, and while the rigidizing material 120 cures to form a rigid layer. In the embodiment illustrated in FIG. 2A, the rigidizing material 120 is introduced within an envelope or volume 248 formed between the back surface 244 of the membrane 114 and an enveloping layer or surface 252. Moreover, in that example, the enveloping surface 252 is provided as part of or associated with the membrane 114. Alternatively, the enveloping layer or surface may be provided by the control surface 208, and the solidifying material 120 can be introduced into a volume formed between the back surface 244 of the membrane 114 and the rigid control surface 208. As described in greater detail elsewhere herein, the rigidizing material 120 can alternatively be applied in layers or in a defined three-dimensional pattern to the back surface 244 of the membrane 114.

Figure 2B:
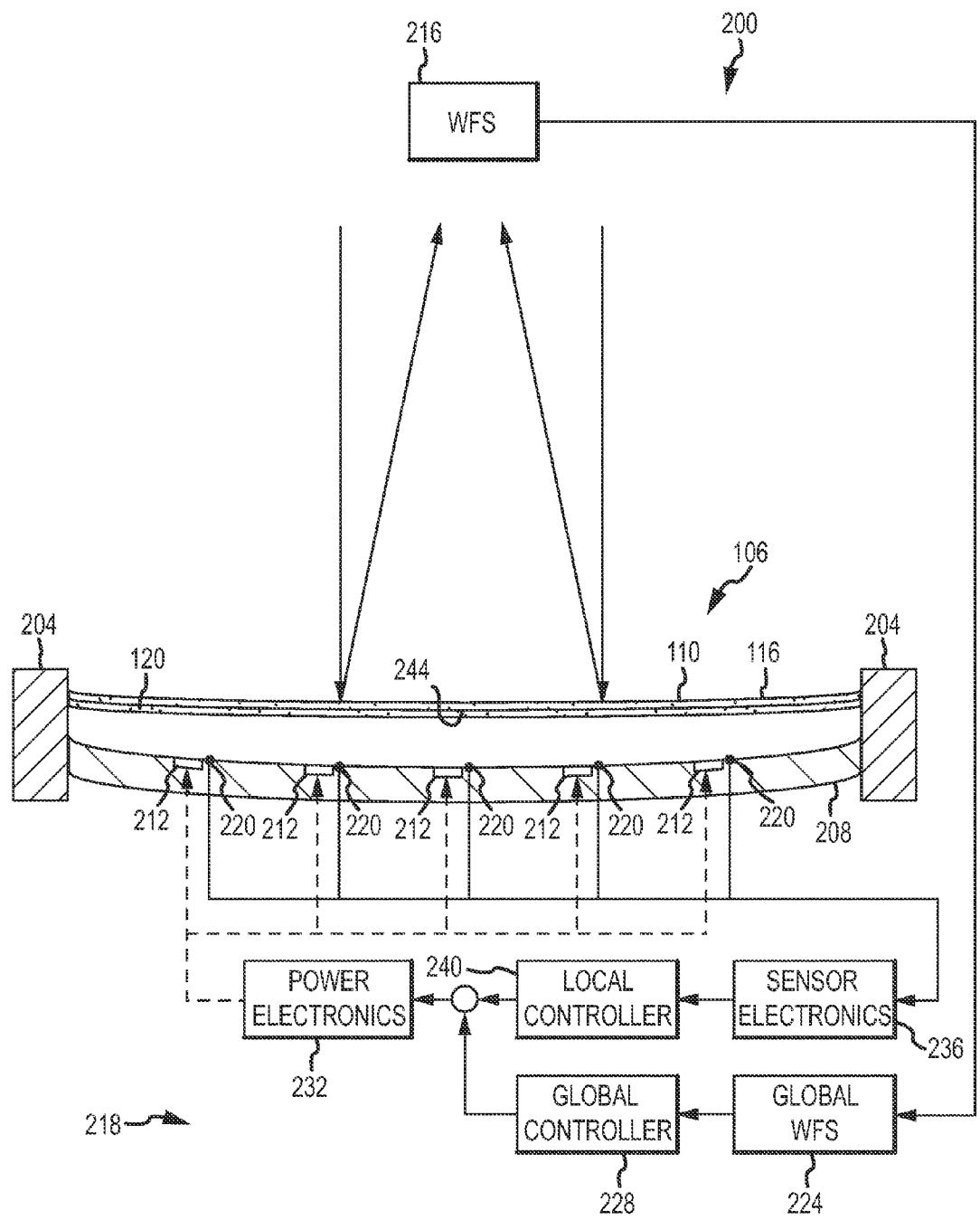
FIG. 2B is a cross-section of a frozen shell mirror and back plate assembly in accordance with embodiments of the present invention.

FIG. 2B is a cross-section of a frozen surface system 200 incorporating a frozen shell mirror 106 in accordance with embodiments of the present invention, while the figure of the reflective surface 116 is being fixed or formed. The shell 110 can be placed within a ring or mount 204 that includes or is associated with a rigid back plate or control surface 208. In accordance with embodiments of the present invention, the shell 110 has the typical characteristics of a shell material while it is in a fixed or frozen state. For example, the shell 110 is sufficiently stiff in the frozen state to maintain the selected figure, at least under some range of environmental conditions. In addition, the shell 110 can be manipulated while in a malleable state, such that the reflective surface 116 can be controlled to achieve a desired mirror figure. In accordance with still other embodiments, the shell 110 can comprise a material that includes carbon nanotubes.

As with the frozen surface system 200 incorporating a frozen membrane mirror 104, in accordance with other embodiments of the present invention, embodiments incorporating a frozen shell mirror 106 can be associated with a rigid control surface 208 that includes or is associated with a plurality of actuators or actuation pads 212 that can be used to control the distance between the shell 110 and the rigid control surface 208. Moreover, such control can be achieved electrostatically. Alternatively, other forces, such as magnetic forces, can be used to control the distance between the shell 110 and the control surface 208. A wavefront sensor 216 and/or proximity sensors 220 can be used to provide information regarding the figure of the reflective surface 116 to control system electronics 218, as described in connection with FIG. 2A.

In accordance with embodiments of the present invention, sensing the figure of the reflective surface 116 and active control of the figure of the reflective surface 116 is maintained while the shell 110 is transitioned from a malleable state to a fixed state. For example, the shell 110 can be placed in the malleable state by heating that material 110 to at least a first temperature, and can be brought into a fixed or frozen state by reducing the temperature of the shell 110 to less than a second temperature. In accordance with still other embodiments, a solidifying material 120 can be applied to the back surface 244 of the shell 110. The solidifying material 120 can form a rigid layer when that material cures. Moreover, active control of the figure of the reflective surface 116 of the shell 110 can be maintained while a solidifying material 120 is applied. A solidifying material 120 can also be applied while the shell 110 is in a malleable state, a frozen state, or transitioning from a malleable state to a frozen state.

Figure 3A:
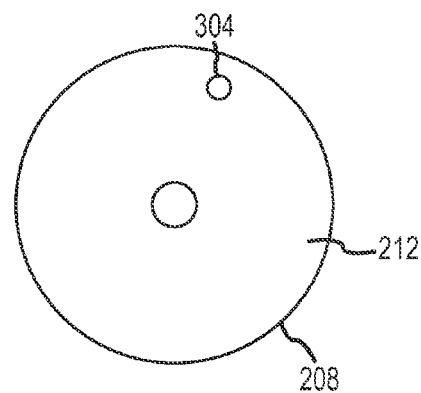
FIG. 3A is a plan view of a rigid control surface in accordance with embodiments of the present invention.
Figure 3B:
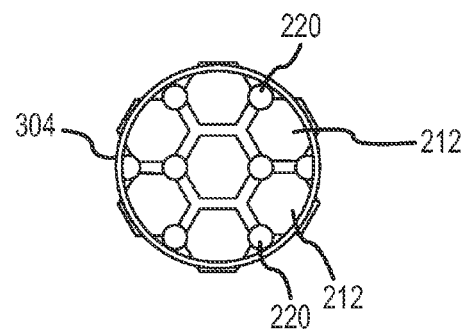
FIG. 3B is a detail of a portion of the rigid control surface illustrated in FIG. 3A.

With reference now to FIG. 3A, an example of a rigid control surface 208 in accordance with embodiments of the present invention is shown in plan view. In general, a large number of actuation pads 212 can be distributed over the area of the rigid control surface 208. For example, as shown in FIG. 3B, which is a detail of an area 304 of the rigid control surface 208 in FIG. 3A, the actuation pads 212 can comprise hexagonal conductive patches that are etched or printed on the rigid control surface 208. As also shown in FIG. 3B, a plurality of proximity sensors 220 can be distributed across the rigid control surface 208. Accordingly, the distance between the membrane mirror 116 and the rigid control surface 208 can be determined at different points within the area of the rigid control surface 208.

Figure 4:
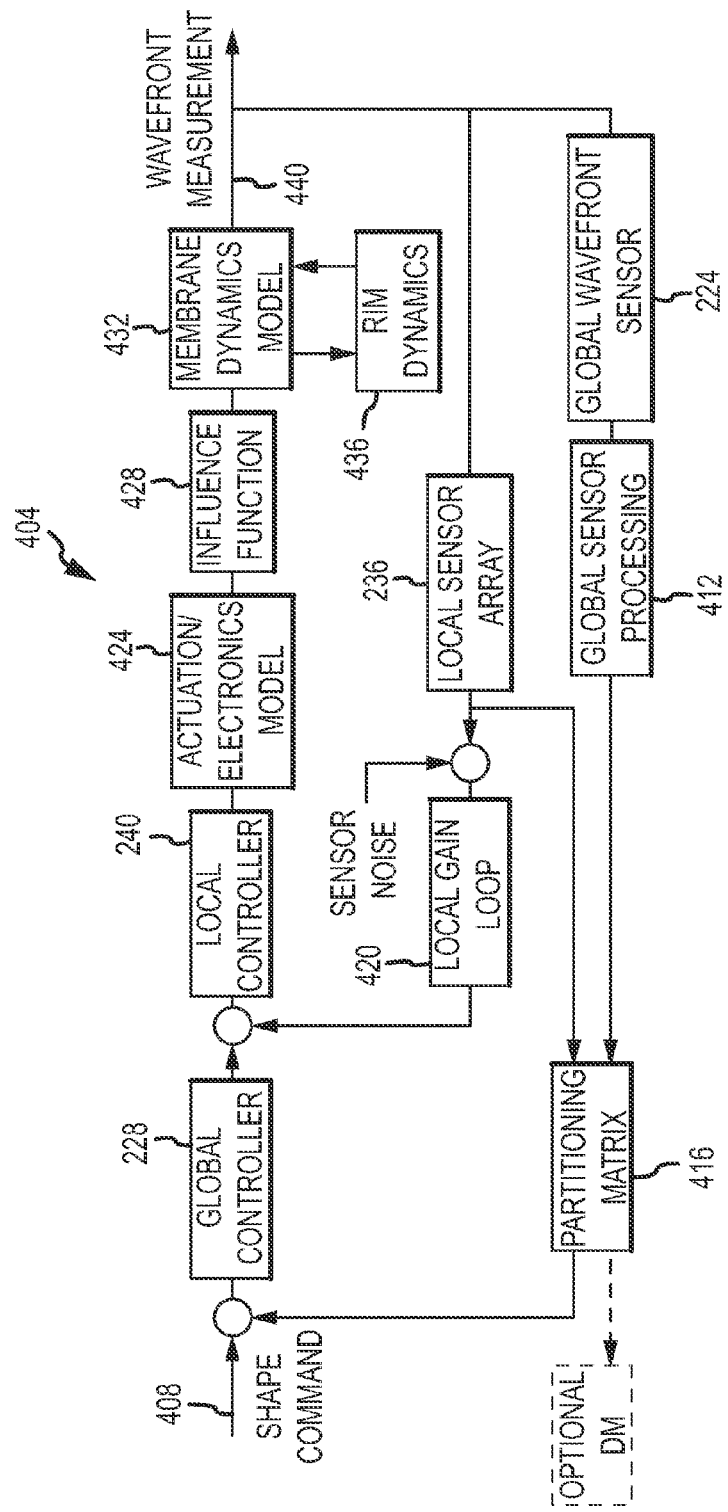
FIG. 4 is a block diagram depicting components of a control system for producing a frozen membrane mirror in accordance with embodiments of the present invention.

FIG. 4 is a block diagram depicting a control system architecture 404 for producing a frozen membrane mirror in accordance with embodiments of the present invention. As can be appreciated by one of skill in the art after consideration of the present disclosure, the control system architecture 404 can be implemented in connection with various components of the frozen membrane mirror system 200, including the control system electronics 218, wavefront sensor 216, proximity sensors 220, the membrane 114, actuators 212, etc. The control system 404 receives a shape command 408 as an input. In general, the shape command 408 specifies the figure that the reflective surface 116 of the membrane mirror 104 is to have. The shape command 408 is fed to a global controller 228. The global controller 228 may also receive information from a global wavefront sensor 224 regarding the actual figure of the membrane mirror 104. Accordingly, the global controller 228 may operate to assess the optical performance of the membrane mirror 104. Moreover, the optical performance of the membrane mirror 104 may be assessed in relation to the shape command 408. As illustrated, the signal from the global wavefront sensor 224 may go through global sensor processing 412 and a partitioning matrix 416, before being provided to the global controller 228.

The output from the global controller 228 may be provided to a local controller 240. In addition to the signal from the global controller 228, the local controller 240 can receive signals from sensor electronics or a local sensor array 236. Moreover, the signals from the local sensor array 236 may comprise information regarding the distance between the membrane 114 and the rigid control surface 208 at different locations. Before being provided to the local controller 240, the output from the sensor electronics or local sensor array 236, together with associated noise, may be processed in a local gain loop 420. The local controller 240 can operate as a high speed loop in controlling the figure of the membrane mirror 104.

The output from the local controller 240 is modified according to an actuation electronics and actuation pads model 424, and an influence function model 428. The resulting output is applied to the membrane dynamics model 432, in association with a rim or frame dynamics model 436, to produce a control output 440. The control output 440 is applied to the power electronics 240, which in turn provides actuation signals to the actuation pads 212. Wavefront or proximity measurements are then taken from the membrane mirror 116, with measurements from the wavefront sensor being provided to the global wavefront sensor processor 224, and measurements from the proximity sensors 220 being provided to the sensor electronics 236. Accordingly, the wavefront 224 and proximity 220 sensors provide feedback that can be applied to adjust the figure of the reflective surface 116 by controlling forces applied to the membrane 114 and reflective surface 116 by the actuator pads 212.

Figure 5A:
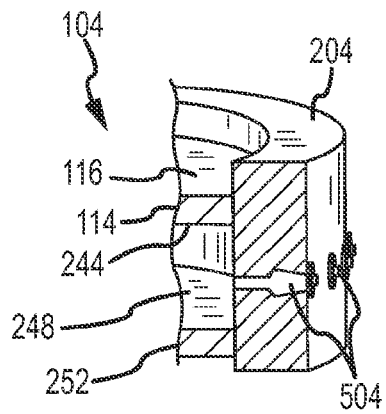
FIGS. 5A-5D illustrate aspects of the formation of a frozen membrane mirror in accordance with embodiments of the present invention.

FIGS. 5A-5D illustrate a partial cross-section of a frozen membrane mirror or mirror system 104, at different steps during the creation of the frozen membrane mirror 104. In particular, in FIG. 5A, active control is used to hold the membrane 114 such that the reflective surface 116 has the desired shape or figure. As can be appreciated by one of skill in the art, the desired figure may comprise the desired final figure of the reflective surface 116. Alternatively, the desired figure at this initial step may be different than the desired final figure, to account for a relaxation or other change in the shape of the membrane 114 and/or the reflective surface 116 after the application and setting of the solidifying material 120. FIG. 5A also shows that the ring 204 can comprise a plurality of inlets or a manifold structure 504 operable to introduce the solidifying material 120 into the envelope or volume 248 formed between the back surface 244 of the membrane 114 and the enveloping surface 252.

Figure 5B:
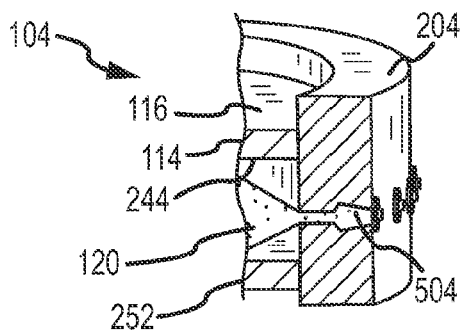
Figure 5C:
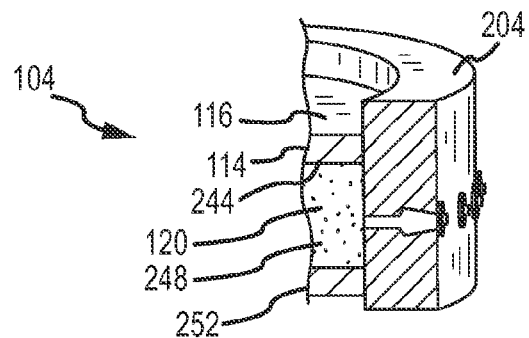
Figure 5D:
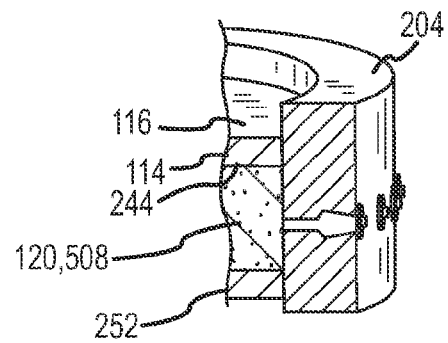

In FIG. 5B, the frozen membrane mirror 104 is shown with the solidifying material 120 being introduced into the volume 248 via the inlets or manifold 504 in the ring 204. For example, the solidifying material may be introduced as a fluid that is forced into the volume 248 by a low pressure pump. While the solidifying material 120 is being introduced, active control over the figure of the reflective surface 116 is maintained. In FIG. 5C, the volume 248 between the membrane 114 and the enveloping surface 252 is completely filled with the solidifying material 120. Active control of the figure of the reflective surface 116 is maintained while the solidifying material 120 cures. In FIG. 5D, the solidifying material 120 has fully cured, forming a rigid material or layer 508 applied to the back surface 244 of the membrane 114. Because the figure of the reflective surface 116 is set by the solidifying material 120, which at this point has formed a rigid layer 508, active control can be discontinued. Accordingly, it can be appreciated that in accordance with embodiments of the present invention, active control is only required during the introduction and curing of the solidifying material 120. In particular, active control can be discontinued once the rigid layer 508 has formed.

Figure 6:
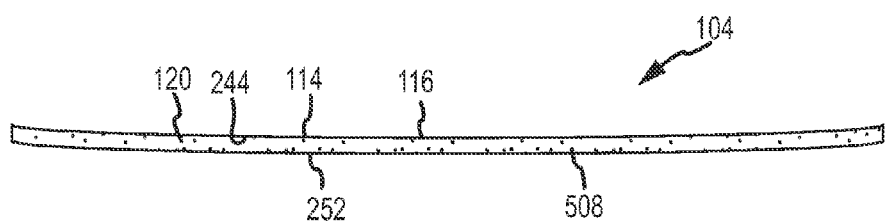
FIG. 6 is a cross-section of a frozen membrane mirror in accordance with embodiments of the present invention.

With reference now to FIG. 6, a completed frozen membrane mirror 104 is illustrated. In particular, with the solidifying material 120 fully cured, the frozen membrane mirror 104 can be disassociated from the rigid control surface 208 and the ring 204. For example, the frozen membrane mirror 104 can be placed within the support structure of a telescope or other optical instrument. Accordingly, the completed membrane mirror 104 comprises the membrane 114, with the reflective surface 116 on a first side of the membrane 114, and the solidified or cured solidifying material 120 (i.e., the rigid material or layer 508) on the back or second side 244 of the membrane 114. Moreover, as shown in the example of FIG. 6, the completed membrane mirror 104 can include an enveloping surface 252.

Figure 7:
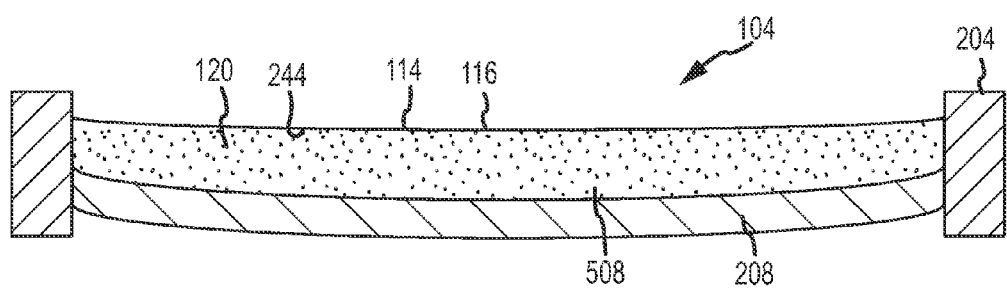
FIG. 7 is a cross-section of a frozen membrane mirror in accordance with other embodiments of the present invention.

In FIG. 7, a completed frozen membrane mirror 104 in accordance with other embodiments of the present invention is illustrated in cross-section. In this embodiment, the frozen membrane mirror 104 continues to be associated with the rigid control surface 208 and/or the ring 204 even after the solidifying material 120 has fully cured to form the rigid layer or material 508. For example, the rigid control surface 208 can comprise a structure that is engineered to provide support for the frozen membrane mirror 104. Alternatively or in addition, the ring 204 can comprise support for the frozen membrane mirror 104. Accordingly, the rigid material 508 can function to set the figure of the reflective surface 116 of the frozen membrane mirror 104, while the rigid control surface 208 and/or ring 204 can supply structure necessary to allow the frozen membrane mirror 104 to be handled, transported, or maintained in a desired operational configuration.

Figure 8:
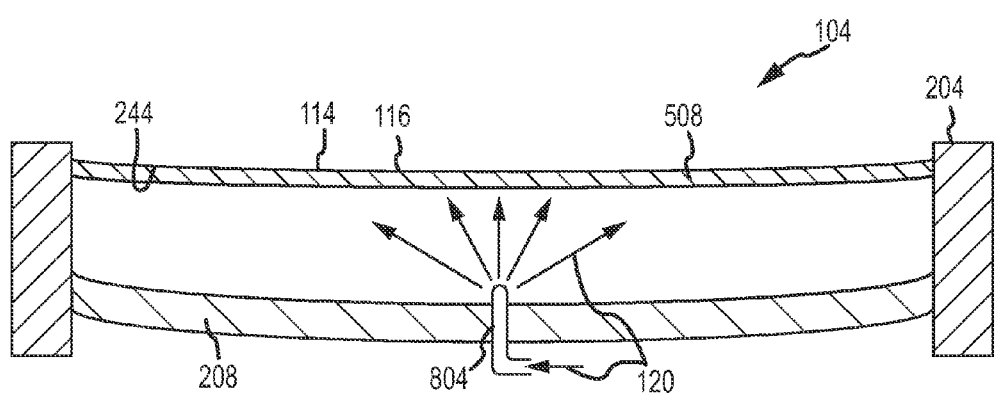
FIG. 8 is a cross-section of a frozen membrane mirror in accordance with other embodiments of the present invention.

FIG. 8 illustrates a cross-section of a frozen membrane mirror 104 during the creation of the frozen membrane mirror 104 in accordance with other embodiments of the present invention. In particular, active control is used to hold the membrane 114 such that the reflective surface 116 has the desired shape or figure. Active control can be implemented through electrostatic control of the spacing between the membrane 114 and a rigid control surface 208. Accordingly, the embodiment illustrated in FIG. 8 can feature the same or similar active control mechanisms as used in other embodiments. A solidifying material 120 is applied to the back side 244 of the membrane 114 via one or more nozzles or spray heads 804. Accordingly, one or more layers of solidifying material 120 are applied to the back surface 244 of the membrane 114. The solidifying material 120 can be applied in one or more application steps. For example, the solidifying material 120 can be applied to the back surface 244 of the membrane 114 in multiple coats. Moreover, the solidifying material 120 can be applied such that it forms a rigid layer 508 that has a uniform thickness. Alternatively, the solidifying material 120 can be applied to form a rigid layer 508 with a thickness that is different at different locations on the back surface 244 of the membrane 114. For example, the solidifying material 120 can be applied such that the rigid layer 508 comprises a webbed structure.

Figure 9:
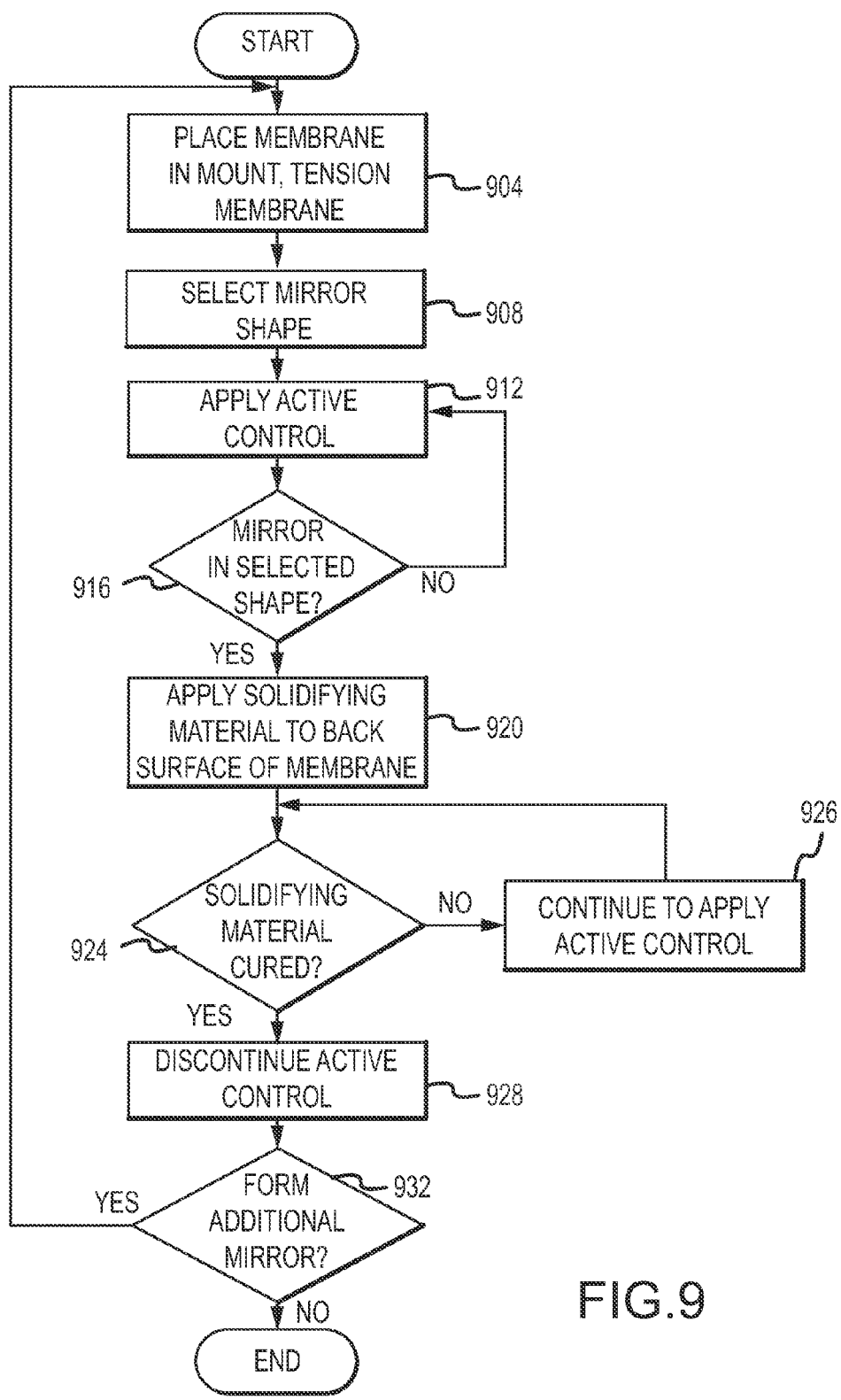
FIG. 9 is a flowchart illustrating aspects of a process for creating a frozen membrane mirror in accordance with embodiments of the present invention.

FIG. 9 is a flowchart illustrating aspects of a process for producing a surface, and in particular a frozen membrane mirror 104, in accordance with embodiments of the present invention. Initially, at step 904, the membrane 114 is placed in a mount or ring 204, and the membrane 114 is tensioned. As an example, the membrane 114 can comprise a polyimide material with aluminized reflective surface 116. At step 908, the desired shape or figure of the frozen membrane mirror 104 is selected and provided as an input to the control system electronics 218, for example as a shape command 408 (step 908).

At step 912, active control is applied to place the reflective surface 116 in the selected mirror shape. At step 916, a determination may be made as to whether the reflective surface 116 of the mirror is in the selected shape. If the selected shape has been obtained, solidifying material 120 is applied to at least the back surface 244 of the membrane 114 (step 920). The process does not advance to step 920 until the selected mirror shape has been obtained. In addition, active control is maintained while the solidifying material 120 is applied to the membrane 114. The application of the solidifying material 120 can be by various methods. For example, the solidifying material 120 can be injected into a volume between the back side 244 of the membrane 114 and an enveloping surface 252 or a rigid control surface 208. As another example, the solidifying material may be sprayed or otherwise applied to the back surface 244 of the membrane 114.

At step 924, a determination is made as to whether the solidifying material 120 has cured, to form a rigid layer 508. If the solidifying material is not sufficiently cured, active control continues to be applied (step 926). Accordingly, it can be appreciated that active control is used to maintain the desired shape or figure of the reflective surface 116 while the frozen membrane mirror 104 is being produced. Once the solidifying material 120 has cured and the rigid layer 508 has thus been formed, active control is discontinued (step 928). The frozen membrane mirror 104 can then be disassociated from the sensor and active control elements, and is ready for use.

At step 932, a determination may be made as to whether an additional mirror 104 is to be formed or produced. If an additional mirror is to be produced, the process may return to step 904, and a new membrane 114 can be placed in the same or a different mount 204 and associated with the same or a different rigid control surface 208 as was used for the production of a previous mirror or mirrors 104. In addition, it should be noted that the mirror shape can be the same or different than a previously produced mirror. Accordingly, it can be appreciated that a process as described herein is flexible in that it can be used to produce mirrors of different shapes. Moreover, mirrors can be produced without requiring grinding and polishing.

In accordance with further embodiments of the present invention, a solidifying material 120 can be applied to the back surface 244 of a membrane 114 while the figure of the membrane's 114 reflective surface 116 is actively controlled. More particularly, the solidifying material 120 can be applied in layers that are gradually built up until the solidifying material 120 has formed a supporting structure or rigid layer 508 adequate to maintain the desired figure of the reflective surface 116, with or without associating the membrane 114 with additional structures (e.g., ring 204). In accordance with still other embodiments of the present invention, the solidifying material 120 can be applied so as to create a three-dimensional structure or rigid layer 508 designed to provide the desired support for the membrane 114. Examples of such structures include honeycomb, grid, or other three-dimensional patterns.

The membrane 114 can comprise a polyimide material with an aluminized reflective surface 116. For example, the membrane 114 can comprise a 50 μm thick polyimide material with a thickness variation of less than 40 nm rms and a surface roughness of about 2 nm. Moreover, the polyimide material can have a zero coefficient of thermal expansion, or a coefficient of thermal expansion that is matched to the mounting ring 204 or other structure. The solidifying material 120 can comprise a dielectric fluid or gel that, after curing, changes to a solid state to form a rigid layer or material 508. As another example, the solidifying material 120 can comprise an epoxy composite. Desirable properties for the solidifying material 120 include low shrinkage, compatibility with electrostatic actuators, thermal stability once cured to form a rigid layer or material 508, and a convenient curing method. In addition, the solidifying material 120 can include solid particles or fibers, to assist in controlling shrinkage and/or to provide desired structural characteristics when the solidifying material 120 is in a solid state. As a further example, the solidifying material 120 can include carbon nanotubes. In accordance with further embodiments, the solidifying material 120 can comprise a UV curable, visible light curable, air curable, thermo set, or other material or plastic. Particular examples of a suitable solidifying material 120 include dental cements, epoxies, or plastics. For instance, the solidifying material can comprise a urethane-modified epoxy acrylate/ $SiO_2$ composite, with a shrinkage of close to zero ($<10^{-5}$ microstrain). Examples of suitable fillers include Kevlar or other non-conductive fibers or particles.

In accordance with embodiments of the present invention, changes in capacitance as a result of the addition of solidifying material 120 between the back surface 244 of the membrane 114 and the control surface 208 does not affect monitoring or control of the reflective surface 116 figure, because that figure is also monitored by wavefront sensor 216. In addition, although the ability to control the figure of the reflective surface 116 decreases as the solidifying material 120 cures to become a rigid layer 508 on the back surface 244 of the membrane 114, at the same time the curing solidifying material 120 increasingly opposes movement of the reflective surface 116 away from the desired figure. In addition, as solidifying material 120 is introduced, the damping of the membrane 116 increases, lowering requirements on the control system 218 bandwidth and on the sampling rate of the feedback sensor or sensors. As described herein, active control of the reflective surface 116 figure is maintained during the curing process. In particular, for many solidifying materials 120, almost all of the shrinkage that occurs while the material 120 cures is completed early in the curing process, while the stiffness modulus continues to increase during the curing process. Therefore, maintaining active control until curing is complete facilitates achieving the desired reflective surface 116 figure.

In an injection type process, the solidifying material 120 can be introduced to an envelope between a back surface 244 of the membrane 114 and a rigid control plate and/or an enveloping surface 252 through injectors 504 disposed about a perimeter of the membrane mirror 104. As an example, the injection process can comprise a vacuum assisted resin transfer method (VARTM) or similar technology. In accordance with further embodiments, an injection process for introducing a solidifying material 120 can comprise a low temperature process. In accordance with embodiments in which a solidifying material 120 is sprayed onto the back surface 244 of the membrane 114, various spray application techniques may be used. For example, one or more sprayers 804 comprising electrostatic sprayers can be used to apply the solidifying material 120 to the back surface 244 of the membrane 114, to produce a rigid layer 508.

Mechanisms for active control include, as discussed above, electrostatic control. For example, where the membrane 114 includes an aluminized reflective surface 116, a bias voltage can be applied to that reflective surface 116. An opposite voltage can then be selectively applied to control pads 212 provided as part of the rigid control plate 208, to draw the reflective surface 116 towards the control plate 208 in areas opposite activated control pads 212. As examples, a control surface 208 can be provided with 50 or fewer actuation pads 212 and a bias voltage of between 2 and 5 kV and a controller perturbation voltage of 200-500V. Other mechanisms for active control of the figure can include magnetic fields, piezoelectric or other mechanisms.

A wavefront sensor 216 comprising a Shack-Hartman wavefront sensor can be used. As an example, a Shack-Hartman sensor with a minimum sampling rate of 30 Hz to support a control bandwidth of two or more Hz can be utilized. Moreover, the Shack-Hartman sensor can support an absolute wavefront error measurement of less than $\lambda/50$ at 632 nm. The wavefront sensor 216 can also include an internal illumination laser source.

Figure 10:
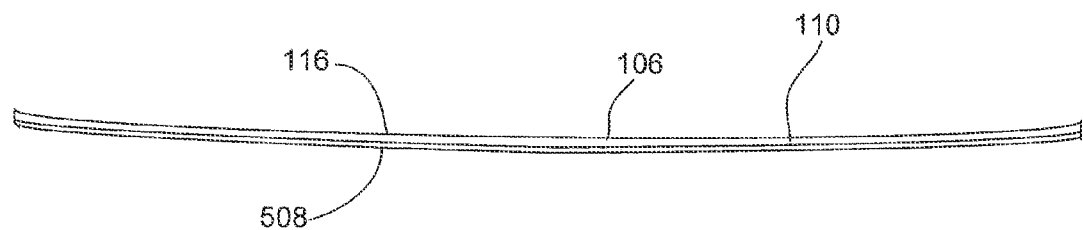
FIG. 10 is a cross-section of a frozen shell mirror in accordance with embodiments of the present invention.

FIG. 10 illustrates a completed frozen shell mirror 106 in cross-section. In particular, the shell 110 has been placed in a fixed or frozen state, thereby fixing the figure of the reflective surface 116. Accordingly, the shell 110 can be disassociated from the rigid control surface 208 and the support ring 204, and is ready to be placed within the support structure of a telescope or other optical instrument. Moreover, the frozen shell mirror 106 is disassociated from active control elements. As shown, the shell 110 can be associated with a rigid layer 508 on the back side 244 of the shell 110.

Figure 11:
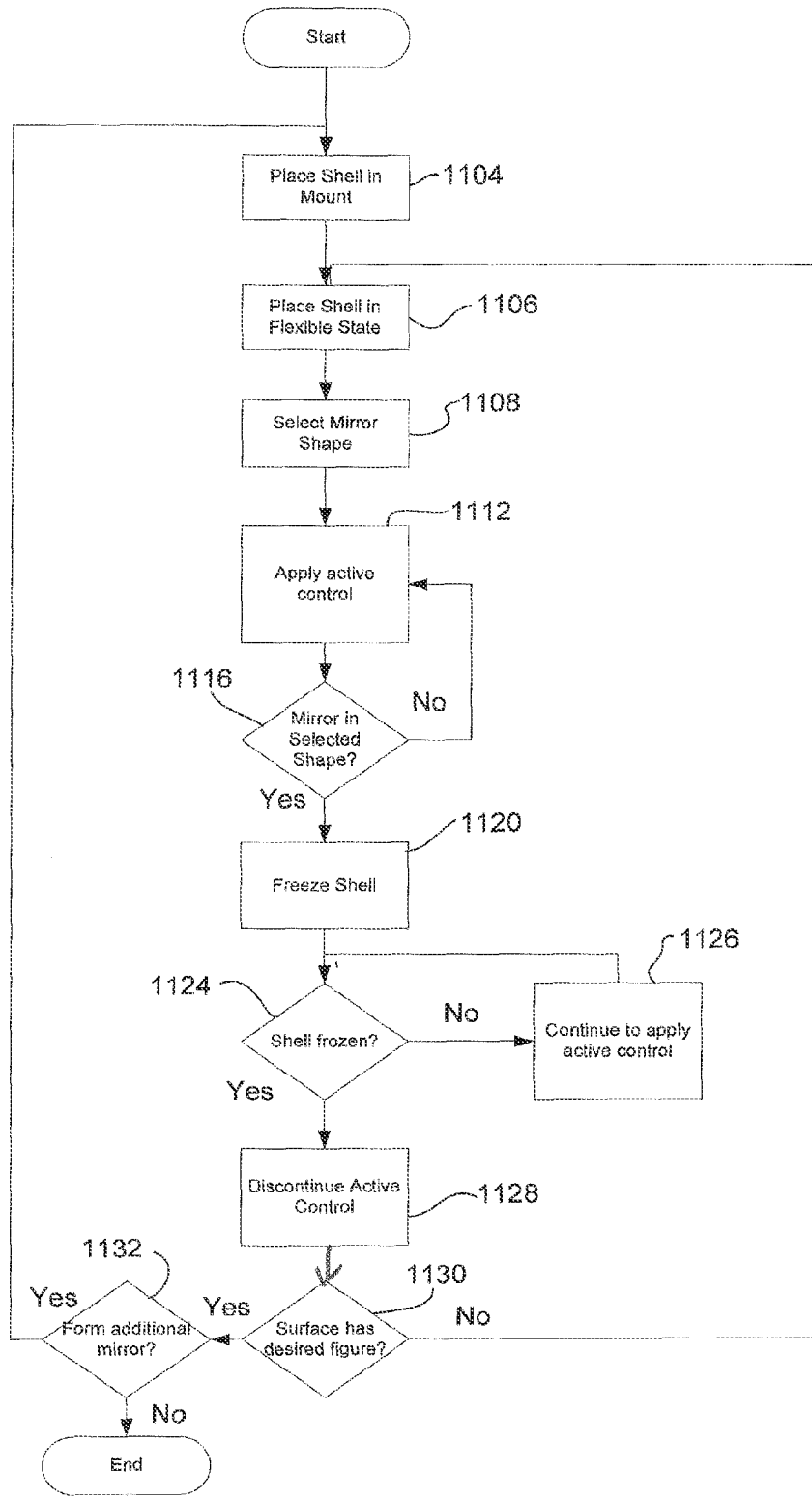
FIG. 11 is a flowchart illustrating aspects of a process for creating a frozen shell mirror in accordance with embodiments of the present invention.

FIG. 11 is a flowchart illustrating aspects of a process for producing a surface, and in particular a frozen shell mirror 106, in accordance with embodiments of the present invention. In accordance with such embodiments, the shell material 110 may be placed in a mount or ring 204, and thereby be placed in proximity to a rigid control surface 208 (step 1104). The shell 110 can then be put into a malleable or flexible state (step 1106). For example, the shell 110 can be heated until at least a first temperature, at which the shell 110 is malleable, is reached. The desired shape or figure of the frozen shell mirror 106 to be produced is selected, and provided as an input to control system electronics 218, for example as a shape command 408 (step 1108). Active control is then applied to place the reflective surface 116 of the shell 110, which at this state of the formation of the mirror is in a malleable or flexible state, into the selected mirror shape (step 1112). At step 1116, a determination is made as to whether the mirror provided by the reflective surface 116 of the shell 110 is actually in the selected shape. For example, a wavefront sensor 116 and/or proximity detectors 220 can be used to make this determination. If the selected shape has not been achieved, active control continues to be applied. Once the selected shape has been achieved, the shell 110 is placed in a fixed or frozen state (step 1120). Placing the shell 110 in a frozen state can include lowering the temperature of the shell 110 to less than a temperature at which the figure of the reflective surface 116 is fixed, at least under some conditions. At step 1124, a determination is made as to whether the shell 110 has transitioned to the fixed or frozen state. If the fixed or frozen state has not yet been achieved, active control continues to be applied (step 1126). Once the shell 110 has reached a frozen state, active control of the figure of the reflective surface 116 can be discontinued (step 1128). In accordance with embodiments of the present invention that incorporate a shell 110 that can be returned to a malleable state after having been frozen, checks can be made to ensure that the figure of the reflective surface 116 has not deviated from the desired figure during the cooling or curing process (step 1130). If a deviation from the desired figure is detected, the process can return to step 1106 and the shape of the shell 110 can be reset.

At step 1132, a determination may be made as to whether an additional frozen shell mirror 106 is to be formed or produced. If an additional shell mirror 106 is to be produced, the process may return to step 1104. In addition, it should be noted that the mirror shape can be the same or different than a previously produced mirror. Accordingly, a process or system for forming a frozen shell mirror as described herein is flexible in that it can be used to produced mirrors of different shapes. Moreover, a frozen shell mirror can be produced that does not require grinding and polishing. For example, where the shell 110 comprises a material that is heated to place it in a malleable state, that shell 110 material can be cooled in order to place it into a frozen state.

Embodiments of the present invention can provide a mirror having a precisely configured figure that is suitable for use in any optical application. Particular examples of applications of embodiments of the present invention include space based telescopes, land based telescopes, or any other optical system. Moreover, multiple frozen membrane mirrors 104 may be included in a single optical system. In accordance with further embodiments, individual segments of a segmented mirror structure can be formed as described herein.

Although certain examples have been discussed in which the frozen surface formed according to embodiments of the present invention comprises a mirror, the present invention is not limited thereto. In particular, embodiments of the present invention can be used where it is desirable to provide a surface having a precisely determined shape.

The foregoing discussion of the invention has been presented for purposes of illustration and description. Further, the description is not intended to limit the invention to the form disclosed herein. Consequently, variations and modifications commensurate with the above teachings, within the skill or knowledge of the relevant art, are within the scope of the present invention. The embodiments described hereinabove are further intended to explain the best mode presently known of practicing the invention and to enable others skilled in the art to utilize the invention in such or in other embodiments and with various modifications required by the particular application or use of the invention. It is intended that the appended claims be construed to include alternative embodiments to the extent permitted by the prior art.

What is claimed is:

1. A method for producing a surface, comprising:
    placing a surface element in a mount;
    applying active control to the surface element to adjust a figure of at least one surface of the surface element, wherein the at least one surface is a reflective surface, wherein applying active control to the surface element includes creating an electrostatic force between the surface element and a control plate;
    sensing the figure of the reflective surface while applying active control to the surface element and while fixing the figure of the reflective surface, wherein sensing the figure includes sensing a distance between a membrane and the control plate; and
    fixing the figure of the at least one surface while continuing to apply active control to the surface element.

2. The method of claim 1, wherein the surface element is a shell, wherein prior to fixing the figure of the at least one surface the shell is brought to greater than a first temperature, wherein fixing the figure of the at least one surface includes reducing a temperature of the shell to less than a second temperature, wherein the first temperature is higher than the second temperature, and wherein active control continues to be applied to the shell while the figure of the at least one surface is fixed.

3. The method of claim 2, further comprising:
    applying a solidifying material to a surface of the shell that is opposite the reflective surface while active control continues to be applied to the shell;
    after the solidifying material has been applied to the second surface of the shell that is opposite the reflective surface, discontinuing the application of active control to the shell.

4. A method for producing a surface, comprising:
    placing a surface element in a mount;
    applying active control to the surface element to adjust a figure of at least a first surface of the surface element, wherein the first surface is a reflective surface, wherein the surface element is a membrane, and wherein placing the surface element in the mount includes placing the membrane under tension;
    sensing the figure of the reflective surface while applying active control to the surface element and while fixing the figure of the reflective surface; and
    fixing the figure of the first surface while continuing to apply active control to the surface element, wherein fixing the figure of the first surface includes applying a solidifying material to a second surface of the membrane, and wherein active control continues to be applied to the membrane while the solidifying material is applied to the second surface of the membrane.

5. The method of claim 4, wherein sensing the figure includes sensing the figure using a wavefront sensor.

6. The method of claim 4, wherein applying the solidifying material includes spraying the solidifying material on to the second surface of the membrane.

7. The method of claim 4, wherein applying the solidifying material includes at least one of injecting the solidifying material between the second surface of the membrane and a control plate and injecting the solidifying material between the second surface of the membrane and an enveloping surface.

8. The method of claim 4, further comprising:
    allowing the solidifying material to cure and form a rigid layer;
    after the rigid layer has formed, discontinuing the application of active control to the membrane.

9. A system comprising:
    a surface element, including:
        a first surface, wherein the first surface is a reflective surface;
        a second surface, wherein the surface element includes at least one of a membrane and a shell, and wherein the second surface is opposite the first surface;

a control plate adjacent the second surface of the surface element;
a first sensor, wherein the first sensor is operable to provide a signal related to a figure of the reflective surface of the surface element;
at least a first controller, wherein the signal related to the figure of the reflective surface of the surface element is provided from the first sensor to the first controller;
a figure control mechanism, wherein the figure control mechanism is operable to actively control the figure of the reflective surface of the surface element, wherein the figure control mechanism is operable to control the figure of the reflective surface of the surface element while the figure is being transitioned to a fixed state, wherein a signal related to the figure of the reflective surface is provided while the figure is being transitioned to the fixed state, wherein a solidifying material is applied to the second surface, wherein active control by the figure control mechanism continues to be applied to the surface element while the solidifying material is applied, and wherein the solidifying material transitions to a cured state to fix the figure of the reflective surface.

10. The system of claim 9, wherein the solidifying material occupies a volume between the second surface of the surface element and at least one of the control plate and an enveloping layer.

11. The system of claim 9, further comprising:
a solidifying material injector, wherein the solidifying material injector is operable to introduce the solidifying material to a volume bounded at least in part by the second surface of the membrane.

12. A frozen surface system, comprising:
a surface element, including:
  a first surface, wherein the first surface is a reflective surface;
  a second surface, wherein the surface element includes at least one of a membrane and a shell;
a control plate adjacent the second surface of the surface element;
a first sensor, wherein the first sensor is operable to provide a signal related to a figure of the reflective surface of the surface element;
at least a first controller, wherein the signal related to the figure of the reflective surface of the surface element is provided from the first sensor to the first controller,
a heater, wherein the heater is operable to place the surface element in a flexible state;
a figure control mechanism, wherein the figure control mechanism is operable to control the figure of the reflective surface of the surface element while the figure is transitioned to a fixed state.

* * * * *